United States Patent [19]

Korte et al.

[11] 4,426,499

[45] Jan. 17, 1984

[54] PROCESS FOR THE PRODUCTION OF GRAFT POLYMERS

[75] Inventors: Siegfried Korte, Leverkusen; Christian Lindner, Cologne; Carlhans Süling, Odenthal; Karl-Heinz Ott, Leverkusen, all of Fed. Rep. of Germany

[73] Assignee: Bayer Aktiengesellschaft, Leverkusen, Fed. Rep. of Germany

[21] Appl. No.: 344,486

[22] Filed: Feb. 1, 1982

[30] Foreign Application Priority Data

Feb. 6, 1981 [DE] Fed. Rep. of Germany ....... 3104101

[51] Int. Cl.³ .......................................... C08F 279/04
[52] U.S. Cl. .................................. 525/316; 524/458; 524/534
[58] Field of Search .............. 525/308, 309, 310, 316; 524/534

[56] References Cited

U.S. PATENT DOCUMENTS 3,644,584  2/1972  Fryd .................................. 525/310
3,969,433  7/1976  Kose .................................. 525/309

OTHER PUBLICATIONS

Chemical Abstracts, vol. 83, No. 2, p. 115, No. 12403k (Jul. 14, 1975).

*Primary Examiner*—Paul R. Michl
*Attorney, Agent, or Firm*—Connolly and Hutz

[57] ABSTRACT

This invention relates to a process for the graft polymerization of (A) from 95 to 40 parts, by weight, of at least one ethylenically unsaturated monomer in the presence of (B) from 5 to 60 parts, by weight, of a partially or completely cross-linked rubber, in which the one or more than one monomer (A) and rubber (B) in the form of a latex or of a dispersion in an organic solvent are polymerized in an aliphatic hydrocarbon as reaction medium at from 30° to 100° C., using a radical forming initiator, and the graft polymerization product obtained as a sedimenting suspension of particles having an average diameter of from 5 to 1,000 μm is isolated.

7 Claims, No Drawings

PROCESS FOR THE PRODUCTION OF GRAFT POLYMERS

This invention relates to a process for the production of graft polymers, in particular ABS polymers, in reaction media consisting essentially of aliphatic hydrocarbons. Polymers which constitute tough and thermostable plastics or plastics components are obtained in a precipitation polymerization process. The term "ABS polymers" is understood to mean a two-phase plastic having a continuous resin phase (exemplified by styrene/acrylonitrile copolymer resin) and a discontinuous elastic phase (exemplified by grafts of styrene and acrylonitrile onto a rubber, such as polybutadiene).

ABS moulding compositions, i.e. mixtures of ABS graft polymers and thermoplastic resins ("two-phase plastics") may be obtained by the polymerization of monomers in the presence of rubber emulsions. When obtained by this method, the polymers must be isolated from the aqueous emulsion by coagulation. In the so-called "latex suspension process in water," the ABS polymers may be separated from the aqueous medium in the form of beads, but the process requires the use of dispersing agents which are liable to impair the properties of the polymers for practical applications (e.g. natural colour or hardness). An ABS product of high rubber content obtained by pure bulk polymerization has unsatisfactory surface properties (insufficient gloss) or an unsatisfactory natural colour. Moreover, bulk polymerization requires considerable technical outlay.

The properties (e.g. notched impact strength) of ABS polymers are governed to a significant extent by the properties and morphology of the rubbers from which they are obtained. Manufacturing processes in which the quality of the rubber is less critical would be desirable.

It has now been found that certain graft copolymers having good qualities may be obtained by precipitation polymerization from aliphatic hydrocarbons and may be directly isolated from the polymerization mixture (e.g. by filtration or centrifuging).

According to U.S. Pat. No. 3,095,388, stable polymer dispersions in an organic medium, inter alia in aliphatic hydrocarbons may be obtained by radical polymerization of vinyl monomers in the presence of from 0.1 to 10% by weight, of a rubber, but this process is limited to rubbers which have not been cross-linked and are soluble in the reaction medium and it does not give rise to stable organosols having particle diameters of only from 0.05 to 2 $\mu$m which are capable of sedimentation.

According to German Offenlegungsschrift No. 1,645,101, organic dispersions containing particles of from 0.01 to 2$\mu$ which are stable in aliphatic hydrocarbons may be obtained by radical polymerisation of vinyl monomers in the presence of graft polymers having certain dissolving or swelling properties.

The present invention relates to a process for the graft polymerisation of:
(A) from 95 to 40 parts, by weight of at least one ethylenically unsaturated monomer in the presence of
(B) from 5 to 60 parts, by weight, of a partially or completely cross-linked rubber,
wherein the monomer or monomers (A) and the rubber (B) in the form of a latex or of a dispersion in an organic solvent are polymerised in an aliphatic hydrocarbon as reaction medium at from 30° to 100° C., using a radical-forming initiator, and the graft polymerisation product obtained as a sedimenting suspension of particles having an average diameter of from 5 to 1,000 $\mu$m is isolated.

The rubbers are preferably used as aqueous latices containing particles having an average diameter of greater than 0.05 $\mu$m and having solids contents of greater than or equal to 20%, by weight, or they are used as dispersions in organic solvents containing particles having an average diameter of greater than 0.05 $\mu$m and solids contents of greater than or equal to 5%, by weight.

The term "average particle diameter" used herein means the so-called "$d_{50}$ value."

Polymerisation must be continued to conversions of more than 40% if suspensions of particles having the desired diameter capable of sedimentation are to be obtained. The graft product may easily be separated from these suspensions by filtration or centrifugation.

At least 5%, by weight, preferably at least 15%, by weight, of the polymerisation monomers are graft polymerised on the rubber. Those portions of the copolymers formed which are not grafted generally have solution viscosities of [$\eta$] of from 0.1 to 5.

The process according to the present invention is a type of precipitation polymerisation, i.e. the polymers separate from the aliphatic hydrocarbons used as precipitation medium in the course of the reaction as easily filtered particles. The process may be carried out batchwise or continuously, under pressure or under reflux. The polymerisation temperatures are preferably from 40° to 80° C.

The process primarily gives rise to dispersions of vinyl polymers modified with rubber in a medium consisting essentially of aliphatic hydrocarbons in which the polymers consist of from 10 to 60%, by weight, of an at least partially crosslinked rubber and from 40 to 90%, by weight, of a polymer formed by radical polymerisation from one or more vinyl monomers, at least 10%, by weight, of which polymer is coupled to the rubber by grafting, and in which the particles of rubber and vinyl polymer have an average diameter of from 20 to 500 $\mu$m.

The aliphatic hydrocarbons which predominate in the reaction medium may be pure substances having clearly defined boiling points of from $-10°$ to $+80°$ C. or mixtures having boiling points of from $-10°$ to $+80°$ C. Butane, pentane and cyclohexane are preferred, as well as petroleum ethers having boiling points of from 40° to 80° C. or from 80° to 110° C.

The rubbers used may be polymers of dienes and acrylates in the form of emulsions in water (latex) or dispersions in an organic solvent; these polymers may contain up to 40%, by weight, of chemically-incorporated comonomers, such as styrene, acrylonitrile, methyl methacrylate, vinyl ethers or esters and polyfunctional vinyl or allyl monomers. The rubber particles contained therein have average diameters of at least 0.05 $\mu$m, preferably from 0.1 to 0.5 $\mu$m, most preferably from 0.3 to 2 $\mu$m. The particles are partially cross-linked or highly cross-linked. Particularly suitable rubbers are polybutadienes and butadiene-styrene or acrylonitrile copolymers which are cross-linked to an extent of at least 40%, by weight, preferably at least 60%, by weight, and polyalkyl acrylate rubbers in particle form which are cross-linked to an extent of at least 40%, by weight, e.g. with polyfunctional comonomers.

The ethylenically unsaturated monomers used for grafting may, for example, be styrene, $\alpha$-methyl styrene, alkyl styrenes, (meth)acrylonitrile, acrylic acid esters and methacrylic acid esters having up to 10 carbon atoms in the alcohol moiety of the molecule, vinyl esters, such as vinyl acetate, maleic acid anhydride, maleic imides, cinnamic acid esters, fumaric acid esters or indene. Styrene, mixtures of styrene and acrylonitrile in proportions, by weight, of from 1:1 to 10:1 and methyl methacrylate are particularly preferred. The monomers and rubber are generally used in proportions of from 95 to 40 parts, by weight, of monomer to from 5 to 60 parts, by weight, of rubber, preferably from 90 to 50 parts, by weight, of monomer to from 10 to 50 parts, by weight, of rubber.

Graft polymerisation in the aliphatic hydrocarbons is carried out in the presence of radical initiators, in particular at polymerisation temperatures of from 40° to 80° C. Initiators which have a half-life of from 2 to 30 hours are particularly suitable. The following are examples: cyclohexyl percarbonate, isopropyl percarbonate, tertiary butyl perpivalate, tertiary butyl peroxy-2,4-dichlorophenoxy acetate and acetyl cyclohexane sulphonyl peroxide.

For some embodiments of the process according to the present invention, it is advantageous to use a redox initiator system of an organic hydroperoxide, $SO_2$ and a soluble organic acid. The optimum activity is at a temperature of from 30° to 60° C. Low boiling aliphatic hydrocarbons may be used as polymerisation medium if the process is carried out without application of pressure. The solvents may in that case be recycled virtually without loss and without great expenditure of energy. The low reaction temperatures improve the quality of the polymers obtained, in particular the raw tone thereof.

The conventional additives may be used, e.g. regulators (such as mercaptans and allyl compounds), surface active substances and dispersing agents (in particular those which are active in organic media). The radical initiators are preferably used in quantities of from 0.1 to 5%, by weight, based on the monomers.

There are various possible methods of introducing the rubber into the polymerisation medium.

If a semi-continuous process is employed, polymerisation is started in a mixture of aliphatic hydrocarbon, monomers and rubber dispersion, and monomers and optionally rubber dispersion are added in the course of the reaction. In a preferred embodiment of the process, a combination of aqueous and organic rubber dispersions is used, in particular for incorporating large quantities of rubber by polymerisation. It is advantageous for the progress of the reaction and for the properties of the products obtained originally to introduce the rubber as an organic dispersion and then to add further quantities in the form of an aqueous dispersion.

If polymerisation is carried out continuously, the residence time is normally from 0.5 to 10 hours if all the components are added simultaneously and if the graft polymer formed is simultaneously removed in the appropriate quantities.

The graft polymers obtained according to the present invention may be isolated as powders after filtration optionally followed by washing and drying.

The polymer may also be directly converted into a suitable form for further processing. In that case, the moist filter cake still containing aliphatic hydrocarbon and unreacted monomer is washed, optionally under pressure, with a low boiling organic liquid which will not dissolve the polymer, and the filter cake which has undergone this preliminary treatment is then transferred to an evaporator where the washing liquid and residual monomers are removed and the polymer is at the same time compacted into a suitable form for thermoplastic processing (e.g. a granulate). The evaporators used may, be for example, evaporator screws or internal kneaders with granulator attached. Energy intensive drying is not necessary. All of the embodiments of the process according to the present invention provide the possibility of recycling all of the components.

The graft polymers produced according to the present invention may be used alone as thermoplastic moulding materials. Since grafting is never complete, they constitute mixtures of the graft polymers proper (polymer of the monomers chemically bound to the rubber) and free (co) polymers of the monomers. These (co) polymers are thermo-plastic resins. Such resins may also be subsequently added to the graft polymers in quantities of up to 95%, by weight, based on the total mixture. Further graft copolymers may also be added to the graft polymers obtained according to the present invention or to mixtures thereof with thermoplastic resins. Particularly suitable graft copolymers for this purpose include emulsion polymerised graft products in styrene, mixtures of styrene and acrylonitrile, preferably in proportions, by weight, of from 90:10 to 50:50, mixtures of styrene and methyl methacrylate and styrene/acrylonitrile/methyl methacrylate. The polymers used as graft base for these graft copolymers are preferably polybutadiene, butadiene/acrylonitrile and butadiene/styrene polymers or butadiene/styrene block copolymers. Acrylic acid ester copolymers and EPDM terpolymers, i.e. terpolymers of ethylene, propylene and minor amounts of a non-conjugated diene may also be used. Such graft products are known.

The thermoplastic resin normally forms a continuous phase (matrix) with the free (co)polymer obtained from the graft copolymerization. It is preferably a polymer of styrene, α-methyl styrene, acrylonitrile, methyl methacrylate and maleic acid anhydride. Polystyrene, styrene/acrylonitrile copolymers having acrylonitrile contents of from 20 to 35%, by weight, and α-methyl styrene/acrylonitrile copolymers having acrylonitrile contents of from 20 to 31%, by weight, are preferred.

If only one graft product is used to prepare the moulding compounds, it is advantageous if the quantitative composition of the graft monomers substantially corresponds to that of the monomers forming the resin. Where two graft products are used, it is advantageous if the quantitative proportions of the styrene and acrylonitrile components in the polymer forming the graft covering of the graft component consisting of the coarser particles differ from those of the resin.

Styrene/acrylonitrile and α-methyl styrene/acrylonitrile copolymers are known.

Graft copolymers and thermoplastic polymers are rapidly prepared according to the present invention by an energy saving method. The moulded products obtained from them by thermoplastic processing have excellent surface characteristics and toughness.

EXAMPLES

I. Preparation of the Graft Copolymers According to the Present Invention

Example 1

The following are introduced into a stirrer vessel:

|  | Parts, by weight | | |
|---|---|---|---|
|  | (A) | (B) | (C) |
| Ligroin (Bp 80–110° C.) | 350 | 350 | 350 |
| Styrene | 118 | 105 | 92 |
| Acrylonitrile | 46 | 41 | 36 |
| Tertiary butyl perpivalate | 5.5 | 5.0 | 4.5 |
| Dispersing agent SKG | 4.5 | 4.5 | 4.5 |

An aqueous polybutadiene emulsion (49%, by weight, cross-linked, average particle diameter 400 nm) is added with intensive stirring:

|  | Parts, by weight | |
|---|---|---|
| (A) | (B) | (C) |
| 19.0 | 38.0 | 57.0 |

After tempering of the contents of the reactor at 60° C., the following are added at a uniform rate within the time intervals indicated:

|  | Parts, by weight | | |
|---|---|---|---|
|  | (A) | (B) | (C) |
| Solution I (6.5 hours) | | | |
| Ligroin (Bp 80–110° C.) | 800 | 800 | 800 |
| Tertiary butyl perpivalate | 8.5 | 7.5 | 6.5 |
| Solution II (6 hours) | | | |
| Ligroin (Bp 80–110° C.) | 122 | 143 | 165 |
| Styrene | 176 | 157 | 137 |
| Acrylonitrile | 70 | 62 | 55 |
| III Polybutadiene emulsion (6 hours) | | | |
| (49%, by weight, cross-linked average particle diameter 400 nm) | 75 | 150 | 225 |

The styrene/acrylonitrile graft polymers are filtered from the dispersions of coarse particles obtained, and then washed with alcohol and dried:

|  | (A) | (B) | (C) |
|---|---|---|---|
| Conversion (%, by weight) based on the monomers put into the process | 76.3 | 71.8 | 69.4 |
| Composition (%, by weight) | | | |
| Styrene | 60.2 | 51.2 | 41.4 |
| acrylonitrile | 27.0 | 22.8 | 20.2 |
| polybutadiene rubber | 12.8 | 26.0 | 38.4 |
| Degree of grafting (%, by weight) based on the quantity of monomers incorporated | 28.5 | 43.1 | 52.2 |
| Gel content (%, by weight) | 37.7 | 57.9 | 69.3 |
| $[\eta]_{sol}^{THF}$ (dl/g) | 1.2 | 1.06 | 1.05 |

Example 2

Procedure the same as in Example 1.

|  | Parts, by weight | | |
|---|---|---|---|
|  | (A) | (B) | (C) |
| Reaction mixture: | | | |
| Ligroin (Bp 80–110° C.) | 336 | 336 | 291 |
| Styrene | 80 | 80 | 117.5 |
| Acrylonitrile | 32 | 32 | 39.5 |
| Tertiary butyl perpivalate | 3.5 | 3.5 | 5.0 |
| Dispersing agent SKG | 3.5 | 3.5 | 4.5 |
| Polybutadiene emulsion (49%, by weight, cross-linked, average particle diameter 400 nm) | 65 | — | — |
| Polybutadiene emulsion (35.6%, by weight, cross-linked, average particle diameter 100 nm) | — | 89.5 | — |
| Acrylate rubber emulsion (38%, by weight, cross-linked, average particle diameter 500 nm) Temperature 60° C. Substances added: | — | — | 86 |
| Solution I (6.5 hours) | | | |
| Ligroin (Bp 80–110° C.) | 800 | 800 | 800 |
| Tertiary butyl perpivalate | 5.0 | 5.0 | 7.1 |
| Solution II (6 hours) | | | |
| Ligroin (Bp 80–110° C.) | 215 | 215 | 162 |
| Styrene | 97 | 97 | 145.5 |
| Acrylonitrile | 40 | 40 | 48.5 |
| III Rubber emulsion (6 hours) | | | |
| Polybutadiene emulsion (49%, by weight, cross-linked, average particle diameter 400 nm) | 350 | — | — |
| Polybutadiene emulsion (35.6%, by weight, cross-linked, average particle diameter 100 nm) | — | 482 | — |
| Acrylate rubber emulsion (38%, by weight, cross-linked average particle diameter 500 nm) | — | — | 464 |

The styrene/acrylonitrile graft polymers obtained after filtration, washing and drying have the following characteristics:

|  | (A) | (B) | (C) |
|---|---|---|---|
| Conversion (%, by weight) Based on monomers used | 67.7 | 60.1 | 74.3 |
| Composition (%, by weight) | | | |
| Styrene | 29.9 | 27.5 | 39.4 |
| acrylonitrile | 15.5 | 14.9 | 16.15 |
| Rubber | 54.6 | 57.6 | 44.45 |
| Degree of grafting (%, by weight) (based on monomers incorporated in the polymer) | 44.0 | 33.5 | 11.9 |
| Gel content (%, by weight) | 74.6 | 71.8 | 51.1 |
| $[\eta]_{sol}^{THF}$ (dl/g) | 0.828 | 1.09 | 1.15 |

Example 3

The following are introduced into a stirrer vessel:

| Ligroin (Bp 80–110° C.) | 291 parts, by weight |
|---|---|
| α-methyl styrene | 108.5 parts, by weight |
| Acrylonitrile | 48.5 parts, by weight |
| tertiary butyl perpivalate | 5 parts, by weight |
| dispersing agent SKG | 4.5 parts, by weight |

65 parts, by weight, of an aqueous polybutadiene emulsion (49%, by weight, cross-linked, average particle diameter 400 nm) are added with vigorous stirring. After tempering of the reactor contents at 70° C., the following are uniformly added within the given time intervals at a reduced stirrer speed.

| Solution I (6.5 hours) | |
|---|---|
| Ligroin (Bp 80–110° C.) | 800 parts, by weight |
| tertiary butyl perpivalate | 7.1 parts, by weight |

-continued

Solution II (6 hours)

| | |
|---|---|
| Ligroin (Bp 80–110° C.) | 170 parts, by weight |
| α-methyl styrene | 134 parts, by weight |
| acrylonitrile | 60 parts, by weight |
| III polybutadiene emulsion (6 hours) (49%, by weight, cross-linked, average particle diameter 400 nm) | 350, parts, by weight |

The α-methyl styrene/acrylonitrile graft polymer is filtered from the coarse dispersion obtained and then washed with alcohol and dried.

| | |
|---|---|
| Conversion (%, by weight) (based on monomers put into the process) | 61.5 |
| Composition (%, by weight) | |
| α-methyl styrene | 33.05 |
| acrylonitrile | 18.5 |
| polybutadiene rubber | 48.45 |
| Degree of grafting (%, by weight) (based on the monomers incorporated) | 10.5 |
| Gel content (%, by weight) | 53.9 |
| $[\eta]_{sol}^{THF}$ (dl/g) | 0.63 |

Example 4

(a) Preparation of an Organic Polybutadiene Dispersion By Vigorous Mixing of

| | Parts, by weight |
|---|---|
| Petroleum ether (Bp 60–70° C.) | 600 |
| Styrene | 273 |
| Acrylonitrile | 107 |
| polybutadiene emulsion (aqueous, 49%, by weight, average particle diameter 400 nm) | 200 |
| Acetic acid | 2 |

A stable polybutadiene dispersion (8.2%, by weight, of polybutadiene, average particle diameter 400 nm) is obtained.

(b) Graft Polymerisation With Cumene Hydroperoxide/SO₂/Trichloroacetic Acid as Catalyst The following are introduced into a stirrer vessel:

| | Parts, by weight |
|---|---|
| Petroleum ether | 125 |
| polybutadiene dispersion (according to 4a) | 300 |
| trichloroacetic acid | 0.5 |
| cumene hydroperoxide | 1.2 |

After the contents of the reactor have been tempered at 50° C., 25 parts, by weight, of solution II are initially added and the following are then added at a uniform rate over the periods of time indicated.

| | Parts, by weight |
|---|---|
| Solution I (7 hours) | |
| petroleum ether (Bp 60–70° C.) | 635 |
| acrylonitrile | 65 |
| styrene | 66 |
| n-dodecylmercaptan | 0.6 |
| Solution II (7 hours) | |
| Petroleum ether (Bp 60–70° C.) | 220 |

-continued

| | Parts, by weight |
|---|---|
| acrylonitrile | 39 |
| styrene | 100 |
| sulphur dioxide | 7.5 |
| Solution III (7 hours) | |
| Petroleum ether (Bp 60–70° C.) | 230 |
| styrene | 100 |
| Cumene hydroperoxide | 4.5 |
| IV polybutadiene dispersion (7 hours) (according to 4a) | 365 |

A styrene/acrylonitrile graft polymer described below is filtered from the coarse dispersion obtained.

| | |
|---|---|
| * Conversion (%, by weight) (based on the monomers put into the process) | 65.3 |
| Composition (%, by weight) | |
| styrene | 58.7 |
| acrylonitrile | 28.7 |
| polybutadiene rubber | 12.6 |
| Degree of grafting (%, by weight) (based on the monomers incorporated) | 15.4 |
| Gel content (%, by weight) | 26.0 |
| $[\eta]_{sol}^{THF}$ (dl/g) | 1.08 |

Example 5

(a) Preparation of Organic Polybutadiene Dispersions

The following are mixed, using a stirrer which produces vigorous turbulence:

| | Parts, by weight | |
|---|---|---|
| | P₁ | P₂ |
| Polybutadiene dispersion | | |
| Ligroin (Bp 80–110° C.) | 555 | 555 |
| styrene | 252 | 252 |
| acrylonitrile | 99 | 99 |
| | 11 | 11 |
| Polybutadiene emulsion (aqueous, 49%, by weight, particle size 400 nm) | 187.5 | — |
| Polybutadiene emulsion (aqueous, 35.5%, by weight, particle size 100 nm) | — | 258 |
| Zephirol solution (50%) | 7.0 | 7.0 | and polybutadiene dispersions P₁ and P₂ are obtained.

After phase separation, 92 parts, by weight, of water are separated from dispersion P₁ and 161 parts, by weight, of water from dispersion P₂.

(b) Graft Polymerisation Using Organic and Aqueous Polybutadiene Dispersions

The following are introduced into a stirrer vessel:

| | Parts, by weight | | | |
|---|---|---|---|---|
| | (A) | (B) | (C) | (D) |
| Ligroin (Bp 80–110° C.) | 160 | 160 | 160 | 160 |
| tertiary butyl perpivalate | 3.5 | 3.5 | 3.5 | 3.5 |
| dispersion P₁ (9%, by weight, average particle diameter 100 nm) | 350 | — | 350 | — |
| Dispersion P₂ (9%, by weight, average particle diameter 100 nm) | — | 350 | — | 350 |

After the reactor has been tempered at 60° C. any polymerisation has begun, the following are added at a uniform rate over the periods of time indicated:

| | Parts, by weight | | | |
|---|---|---|---|---|
| | (A) | (B) | (C) | (D) |
| Solution I (5.5 hours) | | | | |
| Ligroin (Bp 80–110° C.) | 800 | 800 | 800 | 800 |
| tertiary butyl perpivalate | 3.75 | 3.75 | 3.75 | 3.75 |
| Dispersion II (5 hours) | | | | |
| $P_1$ (9%, by weight, particle size 400 nm) | 425 | — | 425 | — |
| $P_2$ (9%, by weight, particle size 100 nm) | — | 425 | — | 425 |
| Dispersion III (5 hours) | | | | |
| Polybutadiene emulsion (aqueous, 49%, by weight, particle size 400 nm) | 270 | — | 110 | — |
| Polybutadiene emulsion (aqueous, 35.5%, by weight, particle size 100 nm) | — | 372 | — | 150 |

Pulverulent graft polymers having the following properties are filtered from the coarse particled dispersions obtained, washed with ethanol and dried:

| | (A) | (B) | (C) | (D) |
|---|---|---|---|---|
| Conversion (%, by weight) | | | | |
| (based on monomers put into the process) | 61.8 | 55.9 | 66.1 | 64.1 |
| Composition (%, by weight) | | | | |
| styrene | 29.5 | 28.8 | 40.2 | 40.8 |
| acrylonitrile | 15.45 | 13.7 | 18.7 | 17.2 |
| polybutadiene rubber | 55.05 | 57.5 | 41.1 | 42.0 |
| Degree of grafting (%, by weight) | | | | |
| (based on monomers incorporated in the polymers) | 41.4 | 31.3 | 42.7 | 31.7 |
| Gel content (%, by weight) | 73.4 | 70.8 | 66.3 | 60.4 |
| $[\eta]_{sol}^{THF}$ (dl/g) | 0.95 | 1.08 | 1.07 | 1.03 |
| Particle size (μm) | 120 | 105 | 95 | 120 |

II. Preparation of Thermoplastic Moulding Compounds From the Graft Copolymers Described in I, Optionally Combined With Styrene/Acrylonitrile Resin

TABLE I

| | Styrene/acrylonitrile copolymer | | |
|---|---|---|---|
| Description | Copolymer composition styrene:acrylonitrile (%, by weight) | Viscosity[1] $\eta_{spec}/C$ | Molecular non-uniformity[2] $U_n$ |
| S | 70:30 | 110 | 2.5 |

[1]Viscosity determined at C = 5 g/l in methylethyl ketone at 25° C.

[2]$U_n = \frac{Mw}{Mn} - 1$ (Mw = mean weight of molar mass; Mn = mean number of molar mass)

A Banbury mixer (Pomini Farrel) was used under the following operating conditions:

| Reaction temperature | 190–225° C. |
|---|---|
| Mixing time | 1.5–2 minutes. |
| Time of cycle | 2–4 minutes. |

After mixing, the material is obtained as a plastic mass on a two shaft mill (roller 1: T=160° C., Roller 2: T=150° C.). The material is removed in the form of a band and granulated after cooling.

(2) Test Method

Standard test rods are produced from the granulate by injection moulding at 220° C. These rods are tested by DIN methods to determine the notched impact strength, impact strength, hardness and heat distortion temperature according to Vicat B. The suitability for processing is tested at 220° C. by the flat spiral test according to H. Ebneth, K. Bohm: Filessfähigkeit von ABS-Polymerisaten; Plastverarbeiter 19 (1968) 4, page 261–269).

TABLE 2

| | Composition of moulding compounds | | |
|---|---|---|---|
| Examples | Graft copolymer from Example (parts, by weight) | Resin polymer according to Table 1 (parts, by weight) | Lubricant (parts, by weight) |
| II. 2. 1. | 100 I.1.A | — | 2 AC[1] |
| II. 2. 2 | 100 I.4.b | — | " |
| II. 2. 3. | 1071 I.2.A | 1929 S | " |
| II. 2. 4. | 535 I.2.B | 2465 S | " |
| II. 2. 5. | 731 I.5.b.C. | 2269 S | " |
| II. 2. 6. | 731 I.5.b.D. | 2269 S | " |

[1]AC = Bis-stearylamide of ethyl diamine.

TABLE 3

| | Properties of the moulding compounds | | | |
|---|---|---|---|---|
| Examples | Notched impact strength 23° C., kJ/m² | Ball indentation hardness 30 S | Heat distortion temperature Vicat B (°C.) | Flow length on flat spiral (cm) at 220° C.) |
| II. 2. 1. | 21 | 102 | 102 | 29 |
| II. 2. 2. | 21 | 109 | 102 | 28 |
| II. 2. 3. | 18 | 69 | 88 | 35 |
| II. 2. 4. | 11 | 107 | 91 | 41 |
| II. 2. 5. | 11 | 109 | 91 | 42 |
| II. 2. 6. | 13 | 108 | 90 | 43 |

Table 3 shows that moulding compounds having exceptionally good mechanical properties are obtained from graft copolymers produced by the present process. Moulding compounds having greater notched impact strength than would be expected from the state of the art are even obtained from finely divided rubber (Example II. 2. 4).

ANNEXE

Dispersing Agent SKG: Reaction products of maleic acid anhydride-1-olefin copolymers with higher alkanols (see G. Sackmann et al Angew, Makromol. Chem. 69 (1978), No. 1041, page 141).

The average particle diameter of emulsions was determined by light scattering measurements or ultra-centrifugation. The particle size of the dispersions was determined using an optical light microscope.

Degrees of grafting were determined according to M. Hoffmann et al. "Polymeranalytik" Georg Thieme Verlag (1977). [η] values are Staudinger Indices determined in the given solvent in dl/g of polymers or soluble polymer components of graft polymers (sol).

We claim:

1. A process for the production of a graft polymer which comprises polymerizing (A) from 95 to 40 parts, by weight, of at least one ethylenically unsaturated monomer in the presence of (B) from 5 to 60 parts, by weight, of an at least partially cross-linked rubber in the form of an aqueous latex containing particles having an average diameter of more than 0.05 μm and having a solids content of at least 20%, by weight, the polymerization being carried out in a reaction medium comprising an aliphatic hydrocarbon at a temperature of from 30° to 100° C. and in the presence of a radical-forming initiator, and isolating sedimented graft polymer particles having a diameter of from 5 to 1000 μm.

2. A process as claimed in claim 1 in which from 90 to 50 parts, by weight, of (A) is polymerised in the presence of from 10 to 50 parts, by weight, of (B).

3. A process as claimed in claim 1 in which (B) has an average particle diameter of from 0.1 to 0.5 μm.

4. A process as claimed in claim 3 in which (B) has an average particle diameter of from 0.3 to 2 μm.

5. A process as claimed in claim 1 in which the polymerisation temperature is from 40° to 80° C.

6. A process as claimed in claim 1 in which the graft polymer particles have an average diameter of from 20 to 500 μm.

7. A process as claimed in claim 1 in which the reaction medium comprises butane, pentane, cyclohexane or petroleum ether.

* * * * *